Sept. 18, 1923.
M. LOUGHEAD
HOSE FITTING
Original Filed Jan. 23, 1923
1,468,601
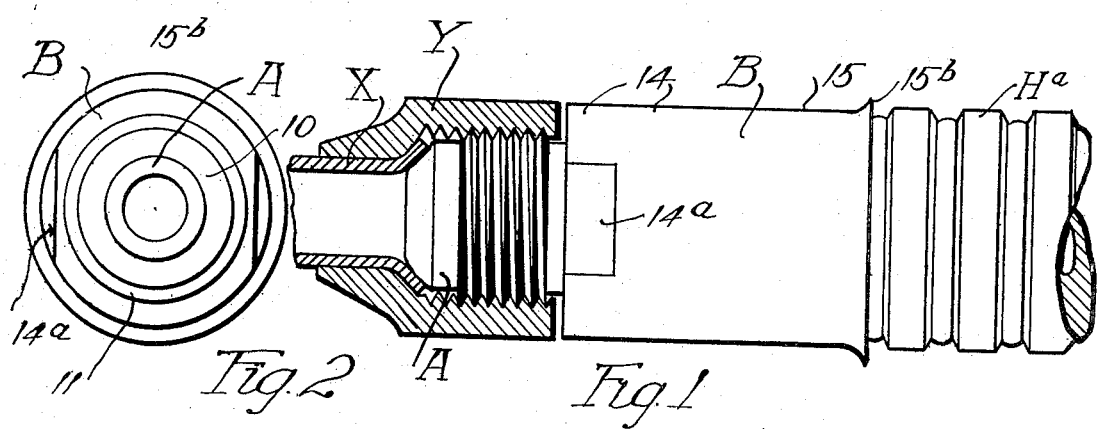
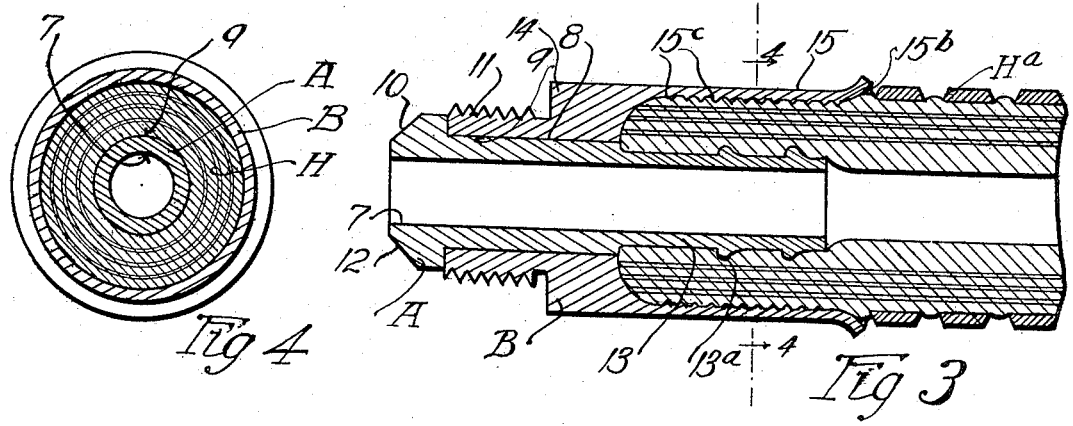
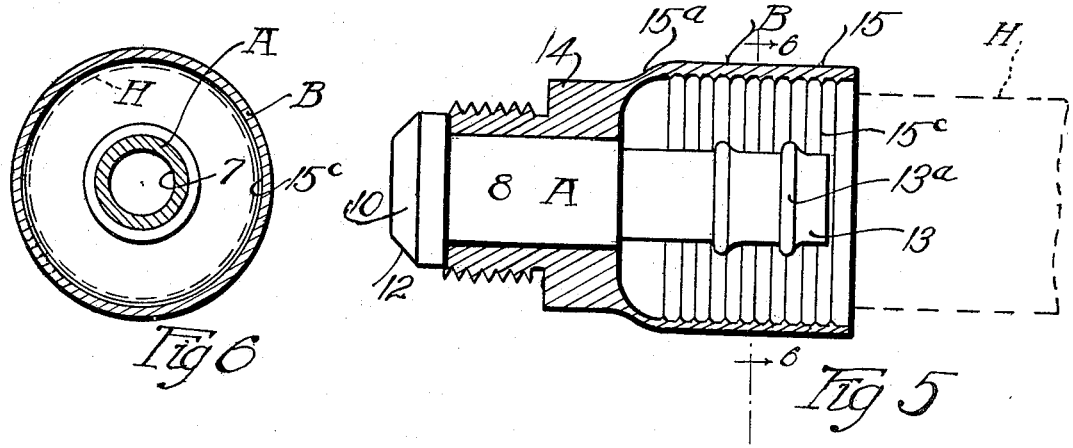
Inventor
Malcolm Loughead
Williams, Bradbury, McCaleb & Pierce
Atty's Patented Sept. 18, 1923.

1,468,601

UNITED STATES PATENT OFFICE.

MALCOLM LOUGHEAD, OF DETROIT, MICHIGAN, ASSIGNOR, BY MESNE ASSIGNMENTS, TO HYDRAULIC BRAKE COMPANY, OF LOS ANGELES, CALIFORNIA, A CORPORATION OF CALIFORNIA.

HOSE FITTING.

Original application filed January 23, 1922, Serial No. 531,141. Divided and this application filed March 8, 1923. Serial No. 623,633.

*To all whom it may concern:*

Be it known that I, MALCOLM LOUGHEAD, a citizen of the United States, and resident of Detroit, in the county of Wayne and State of Michigan, have invented a certain new and useful Improvement in Hose Fittings, of which the following is a full, clear, concise, and exact description, reference being had to the accompanying drawings, forming a part of this specification.

This invention relates to a fitting for the end of a hose and is a division of applicant's prior filed application, Serial Number 531,141, filed January 23, 1922. The object of the invention is the provision of a hose fitting that is comparatively cheap to manufacture, and simple and durable in construction, but which is so constructed that it may be easily applied to the hose, and when applied will securely engage the hose with a fluid tight fit.

The fitting illustrated in the accompanying drawings is a hose coupling device, but I appreciate that the salient features of my invention are applicable to various other hose fittings, such as hose nozzles, hose end plugs, etc. The reinforced hose disclosed may be employed wherever a hose of great strength is desired, but is particularly designed for use in the pipe lines of fluid operated braking systems.

Since my invention will best be understood from a description read in connection with an illustrative drawing, I shall proceed at once to a description of the accompanying drawing, in which—

Figure 1 is a side elevational view illustrating a hose coupling member embodying my invention as it appears when fitted upon a section of hose, portions of a co-operating coupling member being illustrated in section in this view;

Figure 2 is an end view of the coupling member disassociated from the parts shown in section in Figure 1;

Figure 3 is an axial sectional view of the hose and coupling member;

Figure 4 is a transverse section taken on line 4—4 of Figure 3;

Figure 5 is an axial sectional view of the coupling member as it appears prior to application to the hose, one of the elements of the coupling member being illustrated in elevation, the other element being illustrated in axial section, and Figure 6 is a transverse section taken on line 6—6 of Figure 5.

Similar characters of reference refer to similar parts throughout the several views.

Referring first to Figure 6, it will be noted that the coupling member comprises an inner element A and an outer element B. Element A is provided with a bore 7, and has an outer cylindrical surface 8, which fits snugly in the bore 9 of the outer element B. Element A is furthermore provided at its outer end with a flange or shoulder 10, which fits snugly against the adjacent end of the externally threaded boss 11 of element B, shoulder 10 preferably being provided with an annular bevel 12. It will be understood that the threads of boss 9 are adapted to be engaged by an outer collar for the purpose of drawing beveled surface 12 tightly in engagement with a correspondingly shaped seat in a coupling member which mates the one herein illustrated and described in detail. The mating coupling member and its associated nut are illustrated at X and Y respectively. That end of element A remote from flange or shoulder 10 is preferably reduced in diameter to provide a nipple 13, which may be inserted into the hose to which the coupling member is to be attached. Nipple 13 is provided with external flanges or annular ridges 13ª—13ª, which need not differ essentially from the ridges found upon ordinary hose fittings.

Element B similarly to element A is formed in one piece, and in addition to boss 11 comprises the body portion 14 and the comparatively thin sleeve 15. It will be noted that the sleeve 15 originally curves outwardly away from the body portion, as indicated at 15ª. Sleeve 15 is provided on its inner surface with a plurality of inwardly extending ridges 15ᶜ. Prior to the application of the coupling to the hose, the inner diameter of the sleeve is slightly greater than the outer diameter of the hose. The hose is indicated at H, being illustrated in dotted lines in Figures 5 and 6, and in full lines in Figures 1, 3 and 4.

Before applying the fitting or coupling member to a hose, the element A is placed in element B, as illustrated in Figure 5. The hose H is now slipped into sleeve 15, and around the ridged nipple 12. Sleeve 15 is now subjected to a diameter reducing operation, which eliminates the curve 15$^a$, and causes the outer cylindrical surface of the sleeve to lie flush with the curved surfaces of body portion 14. The reduction in the diameter of the sleeve may be accomplished by means of a reducing die or by a spinning operation. If preferred, the body portion 14 may be provided with oppositely located plane surfaces 14$^a$—14$^a$, which permit element B to be grasped by a suitable tool. The reduction of the outer diameter of sleeve 15 results in a corresponding reduction of its inner diameter, and increases its length somewhat. I prefer to so perform the diameter reducing operation as to leave the sleeve with a "belled" or outwardly flaring edge 15$^b$. This "belled" or outwardly flaring edge, together with the fact that the nipple 13 terminates a short distance within the sleeve 15, permits the hose to articulate relatively to the fitting, within certain limits, without injury to the hose. Terminating the nipple 13 some distance within the sleeve 15 prevents the hose being cut by the end of the nipple.

That portion of the hose which lies between nipple 12 and sleeve 15 is very considerably compressed when the diameter of the sleeve is reduced in the manner hereinbefore explained. This compression of the hose causes the same snugly and tightly to engage the sleeve and the nipple, and results in the ridges 13$^a$ and 15$^c$ becoming embedded in the inner and outer surfaces of the hose, respectively. This arrangement provides a fluid tight connection, and also enables the hose to withstand longitudinal stresses tending to pull it off of the nipple.

A particular advantage is afforded by the fact that the elements A and B are mechanically connected together. In the present instance, this mechanical connection is afforded by the elements X and Y. Any other equivalent form of mechanical connection may be employed. In fact, I contemplate that in some cases it may be desirable to form the elements A and B from a single piece of metal. Since both the nipple 12 and sleeve 15 are in frictional contact with the hose, it will be seen that each of these parts tends to prevent dislodgment of the other.

Element A may, of course, be formed of any suitable material, but is preferably formed of metal. Element B is formed of any metal, such as brass, which can successfully be subjected to the diameter reducing operation hereinbefore described. I prefer to form the fitting of my invention in two parts, but appreciate that the elements A and B could be formed in one piece if desired.

Applicant's hose fitting may be employed with any type of hose, but is herein shown applied to a hose which has been reinforced by the application of rings to the external surface thereof to adapt it to withstand the high pressures employed in fluid operated vehicle braking systems. The reinforcing arrangement consists of the rings H$^a$—H$^a$ which are applied to the outer surface of the hose. These rings are formed of some suitable metal, such as brass, which may be compressed to a less size. The rings H$^a$ are originally of a size to permit them to be slipped onto the hose. They are then suitably spaced on the hose and reduced in diameter by means of a reducing die or other suitable device. After being reduced, the rings have an internal diameter slightly less than the external diameter of the hose.

While in the drawings and in the above description, applicant has disclosed but a single type of fitting, it is to be understood that certain modifications therein are contemplated and the invention therefore should be limited merely by the scope of the appended claims.

Having thus described my invention, what I claim is new and desire to secure by Letters Patent of the United States is:

1. In combination with a hose, a first element comprising a body portion lying adjacent one end of the hose, an unsplit sleeve formed integrally with said body portion and lying around the hose end, said body portion being provided with a longitudinal opening, a second element lying in said opening and terminating in a nipple which engages in said hose end, the inner diameter of said unsplit sleeve being less than the normal outer diameter of the hose, the hose being compressed between said nipple and said sleeve.

2. In combination with a hose, a member adapted to lie adjacent one end of the hose, an unsplit sleeve formed integrally with said member and adapted to enclose one end of the hose, said member being provided with a longitudinal opening, a second member disposed and secured in said opening, said second member comprising a nipple which is received in the hose end, the inner diameter of said sleeve being less than the normal outer diameter of the hose.

3. The method which consists in inserting a stem in one end of a section of hose and placing a sleeve around that portion of the hose which receives the stem, and then increasing the length of said sleeve and reducing its inner diameter to compress the hose between the sleeve and the stem.

4. The method which consists in inserting a stem into a hose end, slipping over said hose an unsplit sleeve and then stretching said sleeve and reducing its inner diameter to compress the hose between the sleeve and the stem.

In witness whereof, I hereunto subscribe my name this 2nd day of March, 1923.

MALCOLM LOUGHEAD.